United States Patent
Hutchison et al.

(10) Patent No.: US 8,964,553 B2
(45) Date of Patent: Feb. 24, 2015

(54) NETWORK IMPAIRMENT UNIT WITH BANDWIDTH-CONSTRAINED PACKET DUPLICATION

(75) Inventors: Michael Hutchison, Richmond (CA); Lai Fun Choy, Vancouver (CA)

(73) Assignee: Ixia, Calabasas, CA (US)

( * ) Notice: Subject to any disclaimer, the term of this patent is extended or adjusted under 35 U.S.C. 154(b) by 564 days.

(21) Appl. No.: 13/324,965

(22) Filed: Dec. 13, 2011

(65) Prior Publication Data

US 2013/0148503 A1 Jun. 13, 2013

(51) Int. Cl.
H04L 12/26 (2006.01)

(52) U.S. Cl.
USPC .......................................... 370/235

(58) Field of Classification Search
None
See application file for complete search history.

(56) References Cited

U.S. PATENT DOCUMENTS

| | | | |
|---|---|---|---|
| 7,327,680 B1 * | 2/2008 | Kloth ........................... | 370/235 |
| 7,593,345 B2 | 9/2009 | Dube et al. | |
| 7,633,939 B2 | 12/2009 | Curran-Gray et al. | |
| 2002/0016937 A1 | 2/2002 | Hough | |
| 2004/0218608 A1 | 11/2004 | Patiejunas | |
| 2006/0256720 A1 | 11/2006 | Curran-Gray et al. | |
| 2011/0313753 A1 * | 12/2011 | Green et al. ..................... | 703/28 |
| 2013/0058230 A1 * | 3/2013 | Wvong et al. .................. | 370/252 |
| 2013/0064095 A1 | 3/2013 | Chew et al. | |
| 2013/0148494 A1 * | 6/2013 | Abbas et al. ................... | 370/225 |

OTHER PUBLICATIONS

European Patent Office, European Search Report for European Application No: 12008211.0, mail date Mar. 25, 2013, pp. 1-7.
Anonymous, Spirent XGEM 10Gigabit Ethernet Multi-Profile Network and Impairment Emulator V3.1, User Guide, Spirent Communications, Mar. 2009, pp. 1-211. Retrieved from the Internet Mar. 11, 2013 by the European Patent Office: https://portal.futuregrid.org/sites/default/files/User_Guide_Spirent_Network_and_Impairment_Emulator_XGEM_V3.1.pdf.
Spirent Communications, Inc., Network Playback Module for CES, TOP, MEF-18, G.8261, Spirent Communications, Spirent GEM Ethernet Network Impairment Emulators, Network Playback Module for CES, TOP, MEF-18, G.8261, article, http://www.spirent.com/~/media/Datasheets/Broadband/PAB/GEM_Impairments/GEM_NW_Playback_Module_for_CES_TOP_MEF-18_G8261_Datasheet.pdf, accessed Jan. 17, 2012. pages 1-4.

* cited by examiner

*Primary Examiner* — Ian N Moore
*Assistant Examiner* — Brian T Le
(74) *Attorney, Agent, or Firm* — SoCal IP Law Group LLP; John E. Gunther; Steven C. Sereboff (57) ABSTRACT

An impairment unit, method, and machine readable storage media for emulating network impairments. An impairment unit may include a network interface to receive network traffic from a network and to transmit impaired network traffic to the network. An impairment engine may generate the impaired traffic based on the received network traffic, the impaired network traffic including at least some duplicate packets. The impairment engine may determine a bandwidth available for transmission of duplicate packets based on the received network traffic and may constrain the total length of the duplicate packets to fit within the available bandwidth.

24 Claims, 5 Drawing Sheets

NETWORK IMPAIRMENT UNIT WITH BANDWIDTH-CONSTRAINED PACKET DUPLICATION

RELATED APPLICATION INFORMATION

This patent is related to copending patent application Ser. No. 13/228,291, filed 8 Sep. 2011, entitled Traffic Item Impairment Emulation, and patent application Ser. No. 13/234,060, filed 15 Sep. 2011, entitled Reordering Network Traffic.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be a source of test traffic, a destination for test traffic, or both a source of and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

In order to test the capability of a network to survive or overcome a failure or other condition that impairs the performance of the network, impairments may be controllably introduced into the network. For example, voice over internet protocol (VoIP) networks may execute packet loss concealment strategies to replace packets that are lost during transmission over the network. To test such capability, a programmable impairment unit may be introduced into the network to cause a controlled number of packets to be dropped during transmission. An impairment unit may introduce other forms of impairment such as, for example, delaying packets for a fixed or randomly variable time period, reordering packets, introducing bit errors, duplicating packets, and other impairments.

Within this description, the term "logic circuit" means a collection of hardware, which may be augmented by firmware and/or software, which performs a described function or set of functions. The term "logic circuit" encompasses combinatorial logic and sequential logic such as, for example, state machines. All or portions of a "logic circuit" may be implemented by a micro-controller or other processor. Logic circuits may typically be designed using a hardware description language (HDL) that defines the logic circuits primarily in functional terms. The HDL design may be verified using an HDL simulation tool. The verified HDL design may then be converted into a gate netlist or other physical description of the logic circuits in a process commonly termed "synthesis". The synthesis may be performed automatically using a synthesis tool. The gate netlist or other physical description may be converted into process instructions and masks for fabricating the engine within an application specific integrated circuit (ASIC).

A gate netlist or other physical description of logic circuits may be further converted into configuration data for implementing the logic circuits in a field programmable gate array (FPGA), a programmable logic device (PLD), or a programmable logic arrays (PLA), or other programmable semiconductor device, all of which will be referred to herein as "programmable circuit devices". Configuration data for programming a programmable circuit device may be stored in a memory or a machine readable storage medium and used to configure a programmable circuit device upon power-up of a test system. In this patent, the term "machine readable storage medium" means a physical medium for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" is not intended to encompass transitory media such as signals and waveforms that may convey digital data.

Within this description, the terms "unit" and "engine" also means collections of hardware, which may be augmented by firmware and/or software, which may be on a larger scale or have a more focused function than a "logic circuit". The terms "logic circuit", "unit" and "engine" do not imply any physical separation or demarcation. All or portions of one or more logic circuits, units, and/or engines may be collocated on a common card, such as a network card, or within a common programmable circuit device, ASIC, or other circuit device.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
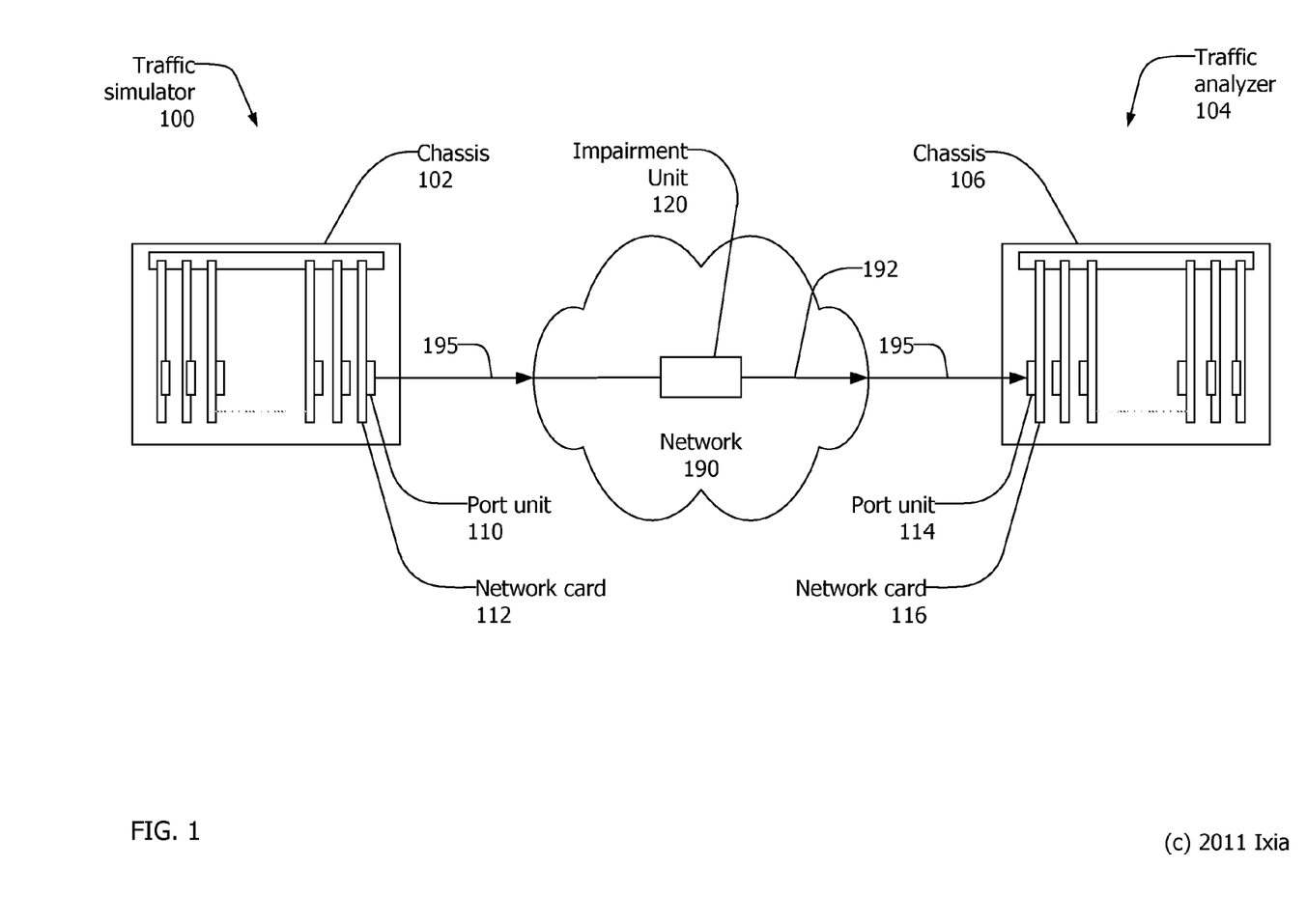
FIG. 1 is a block diagram of a network test environment.

FIG. 1 shows a block diagram of a network test environment. The network test environment may include a traffic simulator 100, a traffic analyzer 104, and a network 190. One or more impairment units 120 may be introduced into the network 190. The traffic simulator 100 may generate test traffic that is received by the traffic analyzer 104 via the network 190. The traffic simulator 100 and the traffic analyzer 104 may be separate physical units, as shown, or may be combined in a single unit the both generates and receives test traffic.

The traffic simulator 100 may be a network test device, performance analyzer, conformance validation system, network analyzer, or network management system. The traffic simulator 100 may be a portion of the network 190 or a device within the network 190 performing self-testing. The traffic simulator 100 may include one or more network cards 112 enclosed within a chassis 102. The chassis 102 may be a fixed or portable chassis, cabinet, or enclosure suitable to contain the network test equipment. The traffic simulator 100 may be an integrated unit, as shown in FIG. 1. Alternatively, the traffic simulator 100 may comprise a number of separate units cooperative to provide traffic generation and/or analysis.

The traffic analyzer 104 may be a network test device, performance analyzer, conformance validation system, network analyzer, or network management system. The traffic analyzer 104 may be a portion of the network 190 or a device within the network 190 performing self-testing. The traffic analyzer 104 may include one or more network cards 116 enclosed within a chassis 106. The chassis 106 may be a fixed or portable chassis, cabinet, or enclosure suitable to contain the network test equipment. The traffic analyzer 104 may be an integrated unit, as shown in FIG. 1. Alternatively, the traffic analyzer 104 may comprise a number of separate units cooperative to provide traffic generation and/or analysis.

The network cards 112/116 may be permanently installed in the traffic simulator 100 and traffic analyzer 104 or may be removable. The network cards 112/116 may include one or more field programmable gate arrays (FPGAs), application specific integrated circuits (ASICs), programmable logic devices (PLDs), programmable logic arrays (PLAs), processors, and other kinds of programmable circuit devices. In addition, the network cards 112/116 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards.

Each network card 112/116 may contain one or more port unit 110/114. Each port unit 110/114 may connect to the network 190 through one or more ports. Each port unit 110/114 may be connected to the network 190 through a communications link 195, which may be a wire, an optical fiber, a wireless link, or other communications link. Each network card 112/116 may support a single communications protocol, may support a number of related protocols, or may support a number of unrelated protocols.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein collectively as "traffic" and individually as "packets". The network 190 may be comprised of numerous nodes interconnected by a mesh of communications paths, providing numerous physical and logical paths for data to travel. There may be plural logical communications paths between the traffic simulator 100 and the traffic analyzer 104.

The impairment unit 120 may be a separate physical device or a portion of one of the traffic simulator 100 and the traffic analyzer 104. The impairment unit 120 may be remotely located from the traffic simulator 100 and/or the traffic analyzer 104. The impairment unit 120 may be introduced into a designated communications path 192 within the network 190 such that at least some of the traffic from the traffic simulator 100 to the traffic analyzer 104 flows through the impairment unit 120. The impairment unit 120 may selectively impair some or all of the traffic that flows along the designated communications path 192. For example, the impairment unit 120 may selectively drop, delay, reorder, duplicate, and/or alter at least some packets that flow along the designated communications path 192.

The designated communications path 192 may be unidirectional, as shown in FIG. 1, or may be bidirectional. If the designated communications path 192 is bidirectional, the impairment unit 120 may be configured to selectively impair packets traveling in either direction (i.e. from left-to-right or right-to-left as shown in FIG. 1) along the designated communications path.

Figure 2:
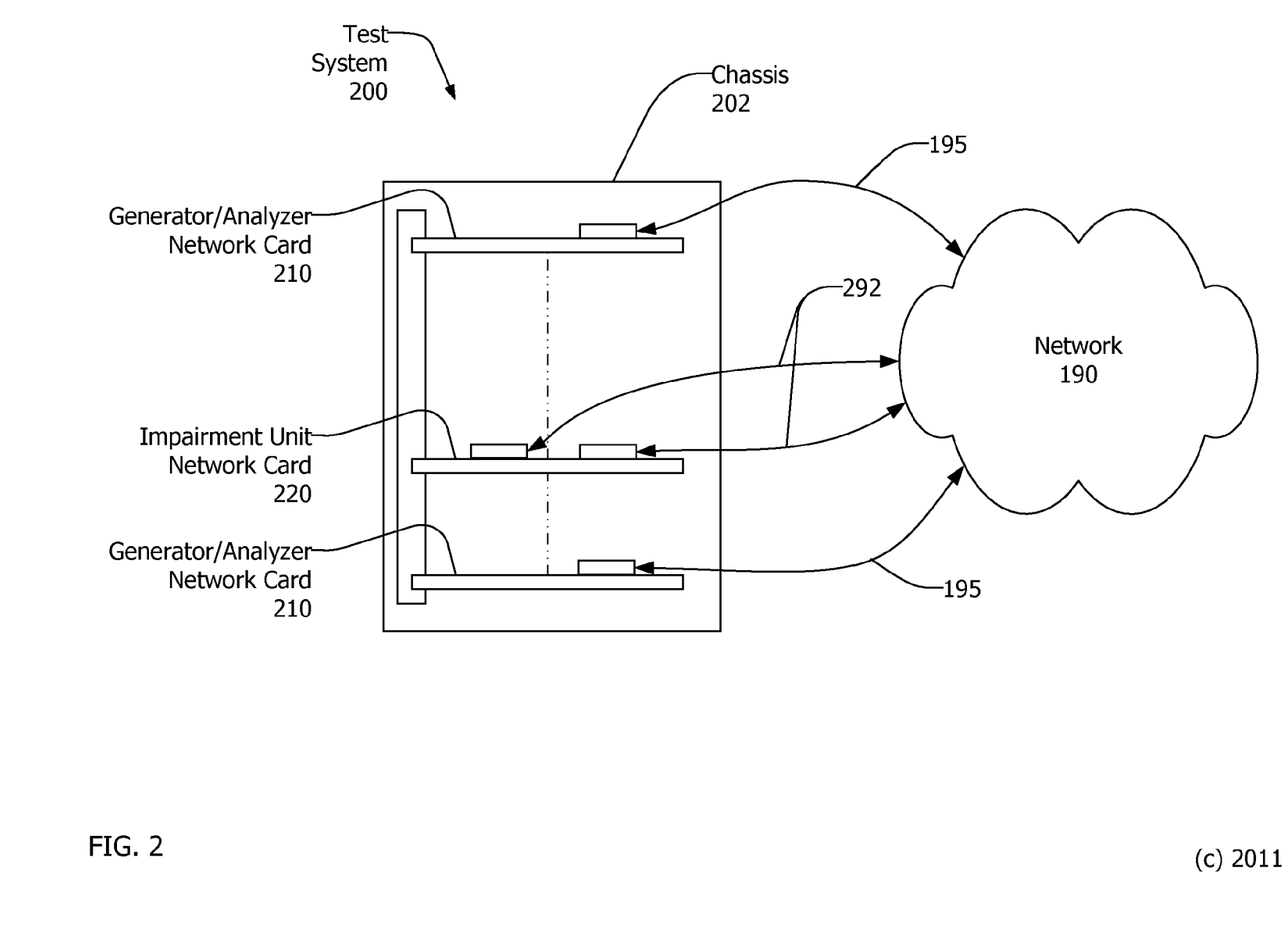
FIG. 2 is a block diagram of a network test environment.

Referring now to FIG. 2, another network test environment may include a test system 200 coupled to the network 190. The test system 200 may include a plurality of generator/analyzer network cards 210 enclosed within a chassis 202. Each generator/analyzer network card 210 may include one or more port units connected to the network 190 via respective bidirectional communications links 195. At least some of the generator/analyzer network cards 210 may generate test traffic for transmission via the network 190. At least some of the generator/analyzer network cards 210 may receive and analyze test traffic from the network 190. Some or all of the generator/analyzer network cards 210 may both generate and analyze test traffic. The plurality of generator/analyzer network cards 210 may collectively perform the functions of the traffic simulator 100 and traffic analyzer 104 of FIG. 1.

The test system 200 may include one or more impairment unit network cards 220. The impairment unit network card 220 may include two ports connected to the network 190 by a pair of communications links 292. In effect, a designated communications path within the network 190 may be broken and connected to the two ports of the impairment unit network card 220. The communications links 292 may be unidirectional or bidirectional, in which case the impairment unit network card 220 may be configured to selectively impair packets traveling in either or both directions.

Figure 3:
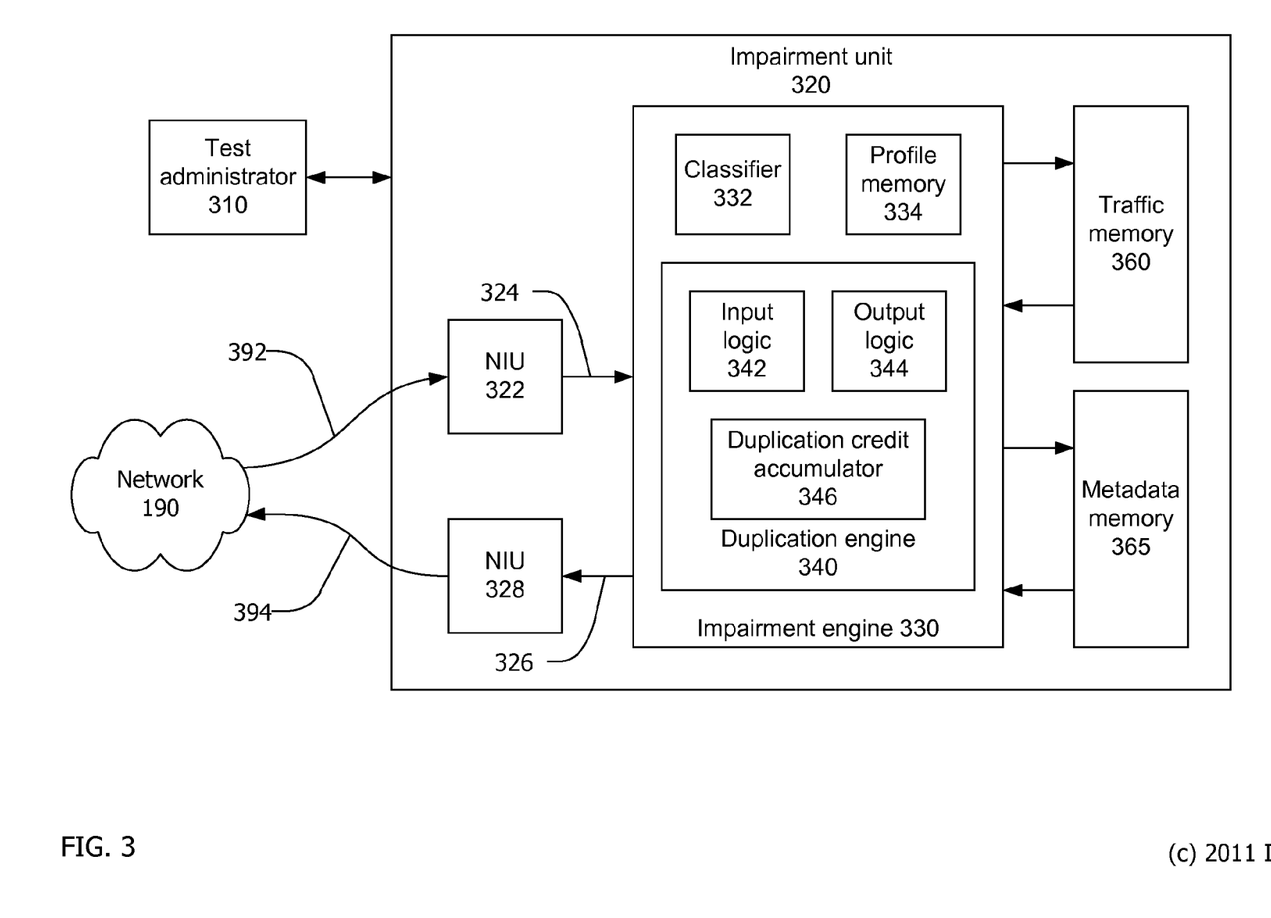
FIG. 3 is a block diagram of an impairment unit.

Referring now to FIG. 3, an impairment unit 320, which may be the impairment unit 120 or 220, may be coupled to the network 190 by two communications links 392, 394. The communications links 392, 394 which may be wires, optical fibers, wireless links, or other communication links. The impairment unit 320 may include a first network interface unit (NIU) 322, a second NIU 328, an impairment engine 330, a traffic memory 360, and a metadata memory 365.

The first NIU 322 may receive electrical, optical, or wireless signals from the network 190 over the communications link 392, and may convert the received signals into incoming traffic 324 in a format usable to the impairment engine 330. Similarly, the second NIU 328 may convert outgoing traffic 326 from the impairment engine 330 into the electrical, optical, or wireless signal format required to transmit the test traffic to the network 190 via the communications link 394.

For ease of discussion, the impairment unit 320 shown in FIG. 3 operates in a half-duplex manner, receiving packets over the communications link 392 and transmitting packet over the communications link 394. An impairment unit may operate in a full-duplex manner, providing a bidirectional flow of packets between the communications links 392 and 394. A full-duplex impairment unit may use common hardware to process packets flowing in both directions. A full-duplex impairment unit may use separate hardware to process packets flowing in each direction, or a combination of common and separate hardware.

The impairment engine 330 may accept the incoming traffic 324 from the NIU 322 and may temporarily store incoming packets in the traffic memory 360. The impairment engine 330 may also store metadata about the incoming packets in the metadata memory 365. The impairment engine 330 may subsequently read stored packets from the traffic memory 360 to form the outgoing traffic 326. The impairment engine 330 may include logic to selectively impair at least some of the packets before transmission. For example, the impairment engine 330 may include logic to delay or reorder selected streams of packets by changing the relative order in which the packets are written into and read from the traffic memory. The impairment engine 330 may include logic to introduce jitter into selected streams of packets by altering the time intervals between transmissions of successive packets in the selected streams. The impairment engine 330 may include logic to impair selected streams by introducing bit errors into transmitted packets. The impairment engine 330 may include logic to impair selected streams by dropping packets (not transmitting received packets) or duplicating packets (transmitting received packets multiple times).

The impairment engine 330 may include a classifier 332 to classify packets within the incoming traffic 324 into a plurality of impairment classes. Each of the plurality of impairment classes may be uniquely associated with a corresponding one of a plurality of impairment profiles stored in a profile memory 334. The term "uniquely associated" means a one-to-one correspondence between impairment classes and impairment profiles. Each impairment profile may define one or more impairments to be applied to packets of the associated class. Each impairment profile may define both types of impairments and one or more parameters defining how each type of impairment is applied. For example, an impairment profile may define that the packets in the associated class should be delayed by a time period specified in the impairment profile, or that a specified portion of the packets in the associated class should be delayed until one or more subsequently-received packets of the same class have been transmitted (thus causing the packets within the class to be reordered). An impairment profile may define multiple impairments to be applied to a class. For example, an impairment profile may define that 1% of the packets in the associated class are reordered, 0.1% of the packets in the class are duplicated, and bit errors are introduced into 0.01% of the packet in the class. One of the plurality of impairment classes may be a default class for traffic that will not be impaired.

The profile memory 334 may be a contiguous block of memory such as random access memory. The profile memory 334 may be a plurality of registers, latches, or other memory circuits distributed within the impairment engine. The profile memory 334 may be a combination of random access memory, registers, latches, and other memory circuits.

The plurality of impairment profiles may be defined prior to a test session. For example, the plurality of impairment profiles may be defined by a test engineer using a test administrator computing device 310. The impairment profiles may be downloaded to the impairment unit 320 from the test administrator computing device 310 before or during the test session. The plurality of impairment profiles may be downloaded from the test administrator computing device 310 to the impairment unit 320 prior to starting a test session.

The classifier 332 may classify each incoming packet based on the contents of the packet. For example, the classifier 332 may filter or parse the header of each packet and determine the class of each packet based on information such as IP source and destination addresses, source and destination ports, protocol, quality or type of service, and other data that can be extracted from the packet header. The classifier 332 may classify each incoming packet based on information contained in the payload of the packet. For example, the classifier 332 may simply read an impairment class field within the payload of each packet. The classifier 332 may determine an impairment class of each incoming packet in some other manner. Patent application Ser. No. 13/228,291, entitled Traffic Item Impairment Emulation, describes methods and apparatus for determining an impairment class based on the content of a received packet.

The impairment class determined by the classifier 332 may then be used as an index to retrieve the associated impairment profile from the profile memory 334. The impairment engine 330, in conjunction with the traffic memory 360, may then process each packet in accordance with the impairment class of the packet. The phrase "process each packet" does not mean or imply that every packet is actually impaired. For example, if an impairment profile requires the reordering (or duplicating, dropping, or some other impairment) of 0.1% of the packets in a corresponding impairment class, the impairment engine 330 may maintain a count of the received packets in the impairment class and reorder every $1000^{th}$ packet. The other packets in the impairment class may be retransmitted from the impairment unit without alteration.

The communications links 392, 394 that couple the impairment unit 320 to the network 190 typically operate at a fixed data rate. For example, these links may be Ethernet links that operate at a fixed bit rate or line rate of 100 MHz, 1 GHz, 10 GHz, 40 GHz, or 100 GHz. The fixed line rate of a link is commonly referred to as the "bandwidth" of the link. The full bandwidth of each link is not necessarily used at all times. However, when a link operates at "50% bandwidth" the link conveys data at the line rate 50% of the time, rather than conveying data at 50% of the line rate.

Many of the possible impairments are bandwidth neutral, which is to say the impairment does not cause the long-term average bandwidth of the outgoing traffic 326 to differ from the long-term average bandwidth of the incoming traffic 324. Impairments that are bandwidth neutral include, for example, delaying packets, reordering packets, and introducing bit errors into packets. Dropping packets within the impairment unit may cause the bandwidth of the outgoing traffic 326 to be less than the bandwidth of the incoming traffic 324. Duplicating packets within the impairment unit may cause the bandwidth of the outgoing traffic 326 to be greater than the bandwidth of the incoming traffic 324. Duplicating packets can create a situation where the impairment unit has more packets available for transmission than can be transmitted within the line rate for the outgoing traffic.

Figure 4:
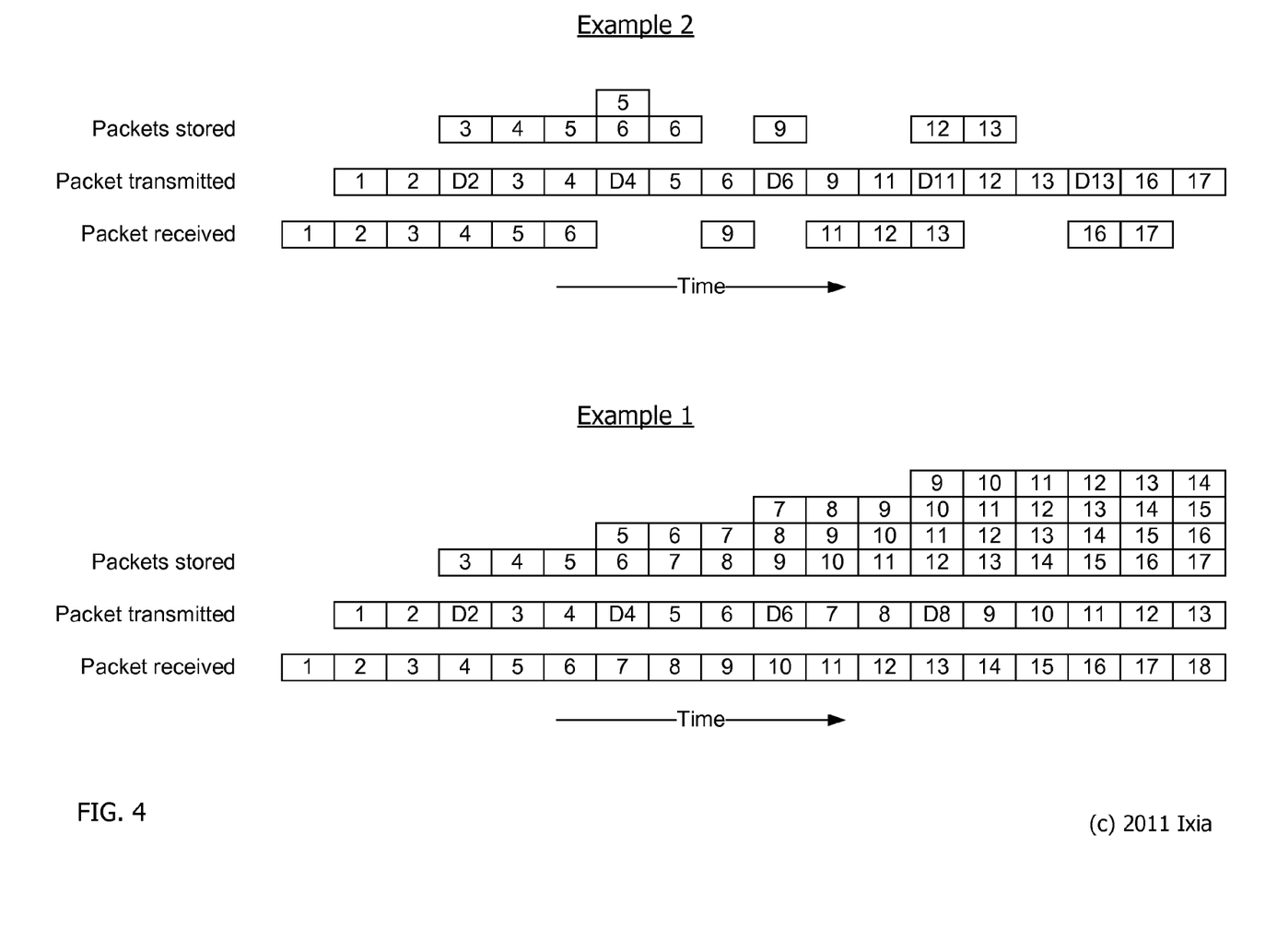
FIG. 4 shows graphical representations of two examples of packet duplication in an impairment unit.

FIG. 4 shows graphical representations of two examples of packet duplication in an impairment unit. In both examples, simplifying assumptions are made that all packets have a length equal to one time interval, and that, in the absence of any impairment, each packet is received in one time interval and transmitted in the subsequent time interval. Further, in both examples, the impairment unit is configured to duplicate alternate received packets. For ease of explanation, incoming packets in both examples are identified by the number of the time interval in which they were received.

In Example 1, incoming packets are received at 100% of line rate, which is to say that a packet is received every time interval. In case, each duplicate packet that is transmitted effectively displaces the packet that would have normally been transmitted in the same time interval. For example, when packet D2 (the duplicate of packet 2) is transmitted, packet 3 must be temporarily stored for one time interval. Each additional duplicated packet (D4, D6, D8) both increases the number of packets that are stored, and increases the length of time for which each stored packet is held in memory. Further, even if the duplication is stopped (after D8 in this example), the delay introduced in the transmitted packets does not decrease so long as incoming packets are received at line rate. Unconstrained duplication, if continued over a long time period, can introduced substantial delays and consume a substantial amount if not all of the available memory within an impairment unit.

Example 2 uses the same assumptions as used in Example 1, except that incoming packets are received at ⅔'s of line rate averaged over an extended period, as exemplified by six (of eighteen) missing received packets compared to Example 1. However, when a burst or cluster of packets are received at line rate (i.e. packets 1 to 6 in Example 2), duplicate packets (D2 and D4 in Example 2) may still displace packets that would otherwise been transmitted in the same time interval. However, the amount of memory required to store displaced packets, and the delay introduced in displaced packets, does not accumulate as seen in Example 1. In this example, packets are received at an average rate of 67% of line rate. If the received packets were simply transmitted (without any duplicate), 33% of the output bandwidth would, on average, be unused and is thus available for transmission of duplicate packets. The available output bandwidth may be used to transmit duplicate packets without causing the endless accumulation of stored and delayed packets as seen in Example 1.

Referring back to FIG. 3, the impairment engine 330 may include a duplication engine 340 to control duplication of packets. The duplication engine 340 may include input logic 342 to make an estimate of the output bandwidth available for duplicate packets. The input logic 342 may make an estimate of bandwidth available for duplicate packets based on the incoming traffic 324.

The input logic 342 may detect a gap length, or idle period, between the end of each received packet and the start of the subsequent packet, which may represent bandwidth available for duplicate packets. However, some protocols, such as Ethernet protocols, require a minimum inter-frame gap and/or a preamble between adjacent packets. The minimum inter-frame gap and preamble do not represent available bandwidth, since equivalent overhead will be required in the outgoing traffic 326. Instead of detecting the gap length between each pair of packets, the input logic 442 may add the total length (including inter-frame gaps and other required overhead) of packets received within a predetermined time interval and subtract the sum from the capacity of the communications link 392 over the same time interval.

Bandwidth for duplicate packets may also be created when received packets are dropped by the impairment engine 330. Once packets within the incoming traffic 324 have been classified and an associated impairment profile has been retrieved from the profile memory 334, the input processor 342 may determine if the received packet is to be dropped. When a received packet will be dropped, the length of the dropped packet may represent bandwidth available for duplicate packets.

Since the impairment unit 320 may delay packets from different impairment classes by different amounts of time, the relative order of packets in the outgoing traffic 326 may be different from the order of packets in the incoming traffic 324. Thus a gap in the incoming traffic 324 or a dropped packet does not necessarily map to an immediate opportunity to transmit a duplicate packet. A gap in the incoming traffic 324 or a dropped packet will create bandwidth for transmission of duplicate packets, but the future time when that bandwidth may be available in the outgoing traffic stream may not be known or predictable to the duplication engine 340.

A duplication credit accumulator 346 may be used to track the amount of bandwidth available for duplicate packets and to constrain the amount of duplicate packets transmitted to fit within the available bandwidth. When there is available bandwidth due to gaps in the incoming traffic, the input logic 342 may add credits, which may be expressed as a packet length that can be transmitted in the available bandwidth, to the duplication credit accumulator 346. The input logic 342 may also add credits equal to the lengths of packets to be dropped to the duplication credit accumulator 346.

The duplication engine 340 may also include output logic 344 to regulate the transmission of duplicate packets by the impairment unit 320. When the impairment engine 330 reads a packet to be transmitted from the traffic memory 360, the impairment engine 330 may also read metadata associated with the packet from the metadata memory 365. The metadata may indicate that the packet is to be duplicated. The impairment engine 330 may then request permission to transmit the duplicate packet from the duplication engine 340. The output logic 344 may compare the length of the packet to be duplicated to the available credits in the duplication credit accumulator 346. When the available credits exceed the length of the packet, permission to transmit the duplicate packet may be granted and the length of the duplicate packet may be subtracted from the value of the duplication credit accumulator. When the available credits are less than the length of the packet to be duplicated, permission to transmit the duplicate packet may be denied and the requested duplicate packet may be dropped (not transmitted). In this way, the cumulative length of all of the duplicate packets transmitted may be constrained to be less than the cumulative bandwidth provided by gaps in the incoming traffic 324 and dropped received packets. The duplication engine 340 may accumulate statistics such as the cumulative number and length of duplicate packets that were transmitted and cumulative number and length of requested duplicate packets that were dropped. Statistics may be accumulated independently for each of the plurality of impairment classes.

Description of Processes

Figure 5:
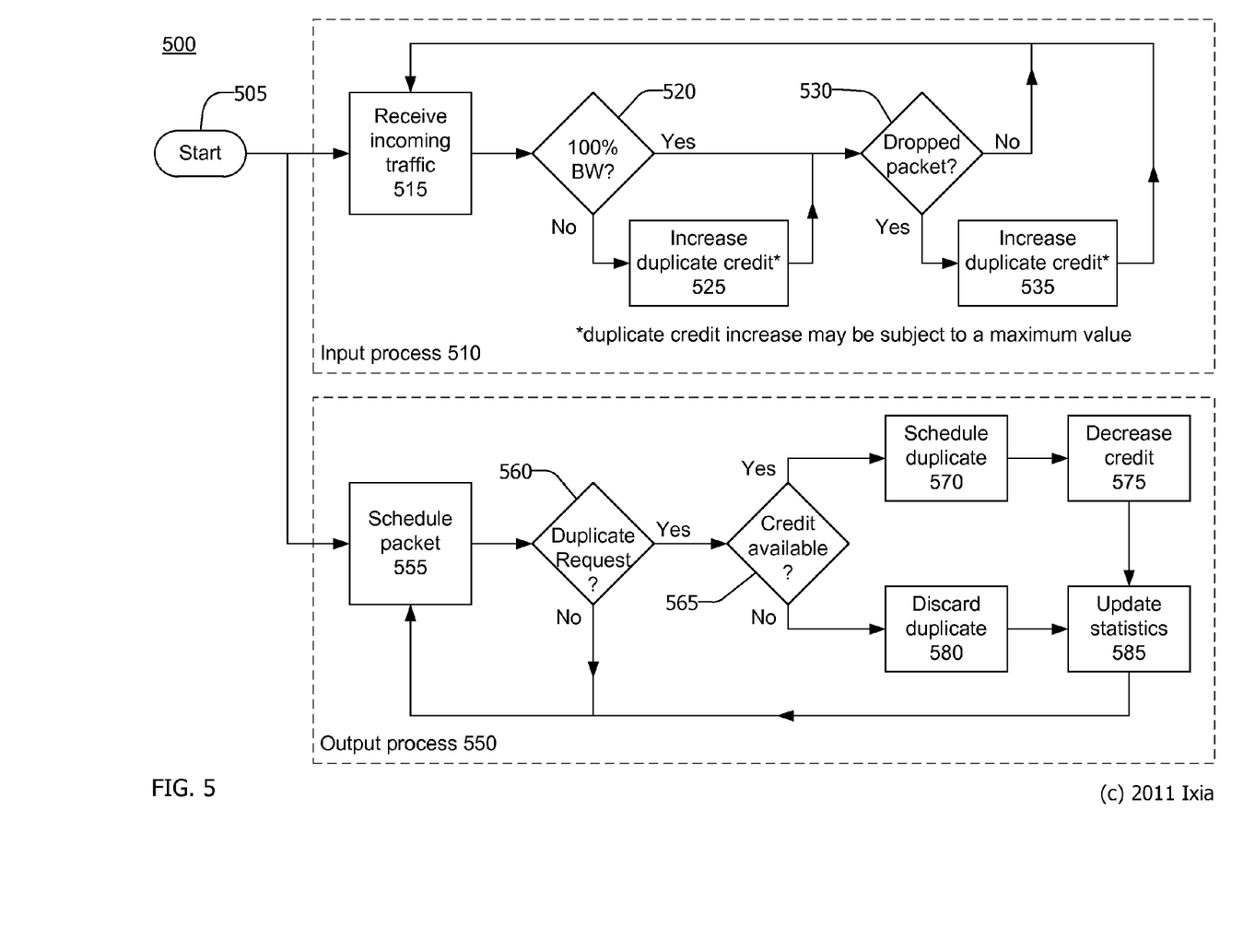
FIG. 5 is a flow chart of a process for managing packet duplication within an impairment unit.

FIG. 5 is a flow chart of a process 500 for managing duplicate packets within an impairment unit such as the impairment units 120, 220, 320. The process 500 may start at 505 after the impairment unit has been inserted into a communications path within a network under test and has been initialized. The impairment unit may be initialized by loading classification rules into a classifier such as the classifier 332 and loading impairment profiles into a profile memory such as the profile memory 334.

The process 500 may include an input process 510 and an output process 550 which may be performed in parallel. The input process 510 and the output process 550 may be performed, for example, by input logic 342 and output logic 344 of the duplication engine 340.

At 515, incoming traffic comprising one or more packets may be received via the network communications path. Although not shown in FIG. 5, the received packets may be stored, manipulated, altered, and eventually transmitted by the impairment unit as outgoing impaired traffic. At 520 a determination may be made whether or not the incoming traffic occupies 100% of the bandwidth of the network communications path. When the incoming traffic occupies less than 100% of the bandwidth of the network communications path, an estimate may be made of the bandwidth that will be available (when the incoming traffic is transmitted as the impaired traffic) for transmission of duplicate packets. The amount of the available bandwidth may be added to a cumulative duplicate credit value at 525, and the process 500 may proceed to 530. When the incoming traffic occupies 100% of the bandwidth of the incoming communications path, the process may proceed to 530 without increasing the duplicate credit value.

The actions at 520 and 525 may be performed on a packet-by-packet basis. A gap length between the end of each received packet and the start of the subsequent packet may be measured. The measured gap length may be reduced by the length of any protocol-required overhead, such as a minimum inter-packet interval or a preamble. The net gap length in excess of the protocol-required overhead may represent bandwidth available for transmission of duplicate packets. The net gap length may be added to a duplicate credit value at 525 after the start of each new received packet. The duplicate credit value may be stored, for example, in a duplicate credit accumulator, such as the duplicate credit accumulator 346, which is accessible to both the input process 510 and the output process 550.

The actions at 520 and 525 may be performed on a fixed-time-interval basis. The total length, including protocol-required overhead, of the received packets may be accumulated over each of a plurality of successive time intervals of predetermined length. The predetermined length of each time interval may be, for example, 1 millisecond or 10 milliseconds or some other interval. After the end of each time interval, the accumulated total length may be subtracted from the bandwidth of the network communications path (expressed as a maximum possible packet length). The remainder may then be added to the duplicate credit value.

At 530, a determination may be made whether or not a received packet will be dropped, which is to say the received packet will not be subsequently transmitted as part of the impaired traffic. Determining whether or not a received packet will be dropped may require determining an impairment class of the received packet, retrieving an impairment profile associated with the impairment class, and deciding if the packet will be dropped based on the impairment profile. When a received packet is dropped, the length of the packet represents bandwidth available for transmission of duplicate packets. The length of dropped packets, exclusive of any protocol-required overhead, may be added to the duplicate credit value at 535. The actions at 530 and 535 may be performed on a packet-by-packet basis. The actions at 530 and 535 may be performed on a fixed-time-interval basis where a total length of dropped packets may be accumulated over each time interval and then added to the duplicate credit value.

The input process 500 may be performed cyclically for a large number of received packets on a packet-by-packet basis or a large number of time intervals on a fixed-time-interval basis. As will be discussed subsequently, the duplicate credit value may be decreased each time a duplicate packet is transmitted as part of the outgoing impaired traffic. However, during periods when no duplicate packets are transmitted, the duplicate credit value may continuously increase at 525 and 535. At a subsequent time, a burst of duplicate packets, having a total length up to the then-current duplicate credit value, may be transmitted. The duplicate packets may displace and delay other packets that may be scheduled for transmission. The displaced packets may have to be temporarily stored as illustrated in FIG. 4. The total length of the temporarily stored displaced packets may be as large as the maximum duplicate credit value. In order to limit the amount of memory that may be needed to store packets displaced by duplicates, the duplicate credit value may be subject to a predetermined maximum value. When the duplicate credit value reaches the predetermined maximum value, no further increases may be allowed at 525 and 535.

The output process 550 may be performed in parallel with the input process 510. At 555, a packet may be scheduled for transmission as part of the outgoing impaired traffic. For example, copending patent application Ser. No. 13/234,060, entitled Reordering Network Traffic, describes how packets can be scheduled for transmission from an impairment unit based on metadata associated with each packet. The metadata associated with each packet may be derived upon receipt of the packet based on an impairment class of the packet and the associated impairment profile. Each packet scheduled for transmission may be subsequently transmitted in the order in which it was scheduled. The time required to transmit a packet depends on the packet length.

At 560, a determination may be made whether or not a duplicate of the packet scheduled at 555 is requested. For example, metadata associated with the packet scheduled at 555 may indicate that one or more duplicates of the packet are requested. When no duplicates are requested, the process 550 may return to 555 to schedule the next packet for transmission. When determination is made at 560 that a duplicate packet is requested, a further determination may be made at 565 whether or not a present duplicate credit value is greater than or equal to the length of the requested duplicate packet. When the duplicate credit value is sufficient, the request to schedule a duplicate packet may be granted, the requested duplicate packet may be scheduled for transmission at 570, and the duplicate credit value may be reduced by the length of the scheduled duplicate packet at 575. When the duplicate credit value is less than the length of the requested duplicate packet, the request to schedule a duplicate packet may be denied and the requested duplicate packet may be effectively discarded at 580.

When a duplicate packet is either scheduled at 570 or discarded at 580, duplication statistics may be updated at 585. The duplication statistics may include, for example, numbers of duplicate packets requested, scheduled, and/or discarded. Duplication statistics may also include the cumulative lengths of duplicate packets transmitted and/or discarded. Duplication statistics may be common to all impairment classes or may be maintained separately for each impairment class. After the duplication statistics are updated at 585, the process 550 may return to 555 to schedule the next packet to be transmitted.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An impairment unit, comprising:
    a network interface to receive network traffic from a network and to transmit impaired network traffic to the network;
    an impairment engine to generate the impaired network traffic based on the received network traffic, the impaired network traffic including at least some duplicate packets, the impairment engine comprising:
    a duplicate credit accumulator storing a duplicate credit value that is increased by bandwidth available for transmission of duplicate packets identified by the impairment engine and decreased by bandwidth used to transmit duplicate packets, and
    output logic configured:
        to compare a length of a requested duplicate packet to the duplicate credit value,
        when the length of the requested duplicate packet is less than or equal to the duplicate credit value, to schedule the requested duplicate packet for transmission as part of the impaired network traffic and reduce the duplicate credit value by the length of the requested duplicate packet, and
        when the length of the requested duplicate packet is greater than the duplicate credit value, to discard the requested duplicate packet,
    whereby the impairment engine determines the bandwidth available for transmission of duplicate packets based on the received network traffic and constrains a total bandwidth of duplicate packets to fit within the bandwidth available for transmission of duplicate packets.

2. The impairment unit of claim 1, the output logic further configured to accumulate duplication statistics including a number of scheduled duplicate packets and a number of discarded duplicate packets.

3. The impairment unit of claim 1, wherein the impairment engine further comprises input logic configured:
    to measure a gap length between each pair of successive packets in the received network traffic and add available bandwidth corresponding to the gap length to the duplicate credit value.

4. The impairment unit of claim 3, wherein the input logic reduces the gap length between each pair of packets by protocol-required overhead and adds a remainder to the duplicate credit value.

5. The impairment unit of claim 3, wherein the input logic is further configured:
    to determine if each packet in the received network traffic is to be dropped and add the length of each dropped packet to the duplicate credit value.

6. The impairment unit of claim 2, wherein the impairment engine further comprises input logic configured:
    to sum a total length of packets in the received network traffic over each of a plurality of successive time intervals, and
    to subtract the sum from a predetermined maximum cumulative packet length and add a remainder to the duplicate credit value after an end of each time interval.

7. The impairment unit of claim 6, wherein the sum includes protocol-required overhead between successive packets.

8. The impairment unit of claim 6, wherein the input logic is further configured:
    to determine a cumulative length of one or more packets received in each time interval that will be dropped and add the cumulative length of the one or more dropped packets to the duplicate credit value.

9. A method of emulating network impairments, comprising:
    receiving network traffic by an impairment unit embedded in a communications path within a network, the received network traffic comprising a plurality of received packets;
    generating impaired traffic based on the received network traffic, the impaired network traffic including at least some duplicate packets; and
    transmitting the impaired network traffic via the communications path,
    wherein generating impaired traffic further comprises:
    determining a bandwidth available for transmission of duplicate packets based on the received network traffic by
        storing a duplicate credit value,
        increasing the duplicate credit value by the bandwidth available for transmission of duplicate packets determined based on the received network traffic, and decreasing the duplicate credit value by the bandwidth used to transmit duplicate packets; and constraining a total bandwidth of duplicate packets to fit within the bandwidth available for transmission of duplicate packets by comparing a length of a requested duplicate packet to the duplicate credit value, when the length of the requested duplicate packet is less than or equal to the duplicate credit value, scheduling the requested duplicate packet for transmission as part of the impaired network traffic and reducing the duplicate credit value by the length of the requested duplicate packet, and when the length of the requested duplicate packet is greater than the duplicate credit value, discarding the requested duplicate packet.

10. The method of claim 9, further comprising:
accumulating duplication statistics including a number of scheduled duplicate packets and a number of discarded duplicate packets.

11. The method of claim 9, further comprising:
measuring a gap length between each pair of successive packets in the received network traffic and adding available bandwidth corresponding to the gap length to the duplicate credit value.

12. The method of claim 11, further comprising:
reducing the gap length between each pair of packets by protocol-required overhead before adding the available bandwidth to the duplicate credit value.

13. The method of claim 11, further comprising:
determining if each packet in the received network traffic is to be dropped and adding the length of each dropped packet to the duplicate credit value.

14. The method of claim 9, further comprising:
summing a total length of packets in the received network traffic over each of a plurality of successive time intervals, and subtracting the sum from a predetermined maximum cumulative packet length and adding a remainder to the duplicate credit value after an end of each time interval.

15. The method of claim 14, wherein the sum includes protocol-required overhead between successive packets.

16. The method of claim 14, further comprising:
determining a cumulative length of one or more packets received in each time interval that will be dropped and adding the cumulative length of the one or more dropped packets to the duplicate credit value.

17. A machine readable storage medium storing programming code that, when used to program a programmable circuit device, configures the programmable circuit device to include:

an interface to receive network traffic from a network and to transmit impaired network traffic to the network an impairment engine to generate the impaired network traffic based on the received network traffic, the impaired network traffic including at least some duplicate packets, the impairment engine comprising:

a duplicate credit accumulator storing a duplicate credit value that is increased by bandwidth available for transmission of duplicate packets identified by the impairment engine and decreased by the bandwidth used to transmit duplicate packets, and output logic configured:
to compare a length of a requested duplicate packet to the duplicate credit value, when the length of the requested duplicate packet is less than or equal to the duplicate credit value, to schedule the requested duplicate packet for transmission as part of the impaired network traffic and reduce the duplicate credit value by the length of the requested duplicate packet, and when the length of the requested duplicate packet is greater than the duplicate credit value, to discard the requested duplicate packet, whereby the impairment engine determines the bandwidth available for transmission of duplicate packets based on the received network traffic and constrains a total bandwidth of duplicate packets to fit within the bandwidth available for transmission of duplicate packets.

18. The machine readable storage medium of claim 17, the output logic further configured to accumulate duplication statistics including a number of scheduled duplicate packets and a number of discarded duplicate packets.

19. The machine readable storage medium of claim 17, wherein the impairment engine further comprises input logic configured:

to measure a gap length between each pair of successive packets in the received network traffic and add available bandwidth corresponding to the gap length to the duplicate credit value.

20. The machine readable storage medium of claim 19, wherein the input logic reduces the gap length between each pair of packets by protocol-required overhead and adds a remainder to the duplicate credit value.

21. The machine readable storage medium claim 19, wherein the input logic is further configured:

to determine if each packet in the received network traffic is to be dropped and add the length of each dropped packet to the duplicate credit value.

22. The machine readable storage medium of claim 17, wherein the impairment engine further comprises input logic configured:

to sum a total length of packets in the received network traffic over each of a plurality of successive time intervals, and to subtract the sum from a predetermined maximum cumulative packet length and add a remainder to the duplicate credit value after the end of each time interval.

23. The machine readable storage medium of claim 22, wherein the sum includes protocol-required overhead between successive packets.

24. The machine readable storage medium of claim 22, wherein the input logic is further configured:

to determine a cumulative length of one or more packets received in each time interval that will be dropped and add the cumulative length of the one or more dropped packets to the duplicate credit value.

* * * * *